US011292283B2

(12) United States Patent
Callegari et al.

(10) Patent No.: US 11,292,283 B2
(45) Date of Patent: Apr. 5, 2022

(54) OPTICAL SECURITY ELEMENT

(71) Applicant: SICPA HOLDING SA, Prilly (CH)

(72) Inventors: Andrea Callegari, Chavannes-près-Renens (CH); Pierre Degott, Mollie-Margot (CH); Todor Dinoev, Chavannes-près-Renens (CH); Christophe Garnier, Reignier (FR); Alain Mayer, Saint-George (CH); Yuliy Schwartzburg, Lausanne (CH); Romain Testuz, Lausanne (CH); Mark Pauly, Lausanne (CH)

(73) Assignee: SICPA HOLDING SA, Prilly (CH)

( * ) Notice: Subject to any disclaimer, the term of this patent is extended or adjusted under 35 U.S.C. 154(b) by 67 days.

(21) Appl. No.: 16/652,321

(22) PCT Filed: Sep. 28, 2018

(86) PCT No.: PCT/EP2018/076434
§ 371 (c)(1),
(2) Date: Mar. 30, 2020

(87) PCT Pub. No.: WO2019/063779
PCT Pub. Date: Apr. 4, 2019

(65) Prior Publication Data
US 2020/0230995 A1 Jul. 23, 2020

(30) Foreign Application Priority Data
Sep. 29, 2017 (EP) ..................................... 17194209

(51) Int. Cl.
B42D 25/324 (2014.01)
B42D 25/44 (2014.01)
(Continued)

(52) U.S. Cl.
CPC ......... *B42D 25/324* (2014.10); *B42D 25/435* (2014.10); *B42D 25/44* (2014.10);
(Continued)

(58) Field of Classification Search
CPC .... B42D 25/324; B42D 25/435; B42D 25/44; G02B 5/1847; G02B 5/1866; G02B 5/1861; G02B 5/1842
(Continued)

(56) References Cited

U.S. PATENT DOCUMENTS 9,844,969 B2   12/2017 Ritter et al.
10,019,626 B2   7/2018 Schilling et al.
(Continued)

FOREIGN PATENT DOCUMENTS

CN   1735843 A    2/2006
CN   103068526 A   4/2013
(Continued)

OTHER PUBLICATIONS

International Search Report and Written Opinion issued with respect to application No. PCT/EP2018/076434.
(Continued)

*Primary Examiner* — Justin V Lewis
(74) *Attorney, Agent, or Firm* — Muncy, Geissler, Olds & Lowe, P.C.

(57) ABSTRACT

The invention relates to a thin optical security element comprising a reflective or refractive light-redirecting surface having a relief pattern operable to redirect incident light from a light source and form a projected image on a projection surface, the optical parameters of this optical security element fulfilling a specific projection criterion such that the projected image comprises a caustic pattern reproducing a reference pattern that is easily visually recogniz-
(Continued)

able by a person. The invention also relates to a method for designing a relief pattern of an optical security element.

13 Claims, 16 Drawing Sheets

(51) Int. Cl.
  *G02B 5/18* (2006.01)
  *B42D 25/435* (2014.01)
(52) U.S. Cl.
  CPC ......... *G02B 5/1842* (2013.01); *G02B 5/1847* (2013.01); *G02B 5/1861* (2013.01); *G02B 5/1866* (2013.01)
(58) Field of Classification Search
  USPC .......................... 283/67, 70, 72, 94, 98, 901
  See application file for complete search history.

(56) References Cited

U.S. PATENT DOCUMENTS

| | | | |
|---|---|---|---|
| 10,166,808 B2 | 1/2019 | Ritter et al. | |
| 10,870,305 B2 | 12/2020 | Fuhse et al. | |
| 2004/0101982 A1 | 5/2004 | Woontner | |
| 2004/0206920 A1* | 10/2004 | Wilson | G06K 19/06046 250/556 |
| 2017/0242263 A1 | 8/2017 | Raymond et al. | |

FOREIGN PATENT DOCUMENTS

| | | |
|---|---|---|
| CN | 104736346 A | 6/2015 |
| CN | 105793058 A | 7/2016 |
| CN | 105934779 A | 9/2016 |
| EP | 2711745 | 3/2014 |
| EP | 2927013 | 10/2015 |
| EP | 2963464 | 1/2016 |
| WO | 9937488 | 7/1999 |

OTHER PUBLICATIONS

International Preliminary Report on Patentability issued with respect to application No. PCT/EP2018/076434.
Chinese Office Action in counterpart Chinese Application No. 201880063240.2 dated Apr. 19, 2021 (and English language translation of the Office Action).

* cited by examiner

OPTICAL SECURITY ELEMENT

TECHNICAL FIELD

The present invention relates to the technical field of reflective or refractive optical security elements operable to project caustic patterns upon appropriate illumination, and method for designing such optical security elements.

BACKGROUND ART

There is a need for security features on objects, that can be authenticated by the so-called "person in the street", using commonly available means. These means include using the five senses—mostly, sight and touch—plus using widespread tools, such as for example a mobile phone.

Some common examples of security features are forensic fibers, threads or foils (incorporated into a substrate like paper for example), watermarks, intaglio printing or microprinting (possibly printed on a substrate with optically variable inks) which can be found on banknotes, credit cards, ID's, tickets, certificates, documents, passports etc. These security features can include optically variable inks, invisible inks or luminescent inks (fluorescing or phosphorescing under appropriate illumination with specific excitation light), holograms, and/or tactile features. A main aspect of a security feature is that it has some physical property (optical effect, magnetic effect, material structure or chemical composition) that is very difficult to counterfeit so that an object marked with such a security feature may be reliably considered as genuine if the property can be observed or revealed (visually or by means of a specific apparatus).

However, when the object is transparent, or partially transparent, these features may not be appropriate. In fact, transparent objects often require that the security element having the required security features does not change their transparency or their appearance, either for aesthetic or for functional reasons. Notable examples may include blisters and vials for pharmaceutical products. Recently, for example, polymer and hybrid banknotes have incorporated in their design a transparent window, thus generating the desire for security features that are compatible with it.

Most existing security features of security elements for documents, banknotes, secured tickets, passports, etc. have not been specifically developed for transparent objects/areas and, as such, are not well-suited for such an application. Other features, for example, those obtained with invisible and fluorescent inks require specific excitation tools and/or detection tools, which may not be readily available for "the person in the street".

Semi-transparent optically variable features (e.g. liquid crystal coatings, or latent images from surface structures) are known and can provide this kind of functionality. Unfortunately, the marking incorporating such security features generally must be observed against a dark/uniform background for the effect to be well visible.

Other known features are diffractive optical elements, such as non-metallized surface holograms. A disadvantage with these features is that they show a very low contrast visual effect when viewed directly. Furthermore, when used in combination with a monochromatic light source to project a pattern, they typically require a laser to give a satisfactory result. Moreover, a quite precise relative spatial arrangement of the light source, the diffractive optical element and the user's eyes is required in order to provide a clearly visible optical effect.

Laser engraved micro-text and or micro-codes have been used for e.g. glass vials. However, they require expensive tools for their implementation, and a specific magnifying tool for their detection.

It is therefore an object of the invention to provide an optical security element for transparent or partially transparent objects (or substrates), that has security features that can be easily authenticated visually by a person, using either no further means (i.e. with naked eye) or commonly and easily available means (e.g. mere magnifying lens). Another goal of the invention is to provide an optical security element easy to manufacture in large numbers, or compatible with mass-production manufacturing processes. Moreover, illumination of the optical security element should also be possible with easily available means (e.g. a light source like an LED of a mobile phone, or the sun), and the conditions for good visual observation by a user should not require a too strict relative spatial arrangement of the light source, the optical security element and the user's eyes.

Further, most of the objects listed above have a reduced size, at least in one dimension (e.g. a banknote may only be less than 100 µm thick). It is therefore a further object of this invention to provide an optical security element that is compatible with objects of reduced dimensions (e.g. thickness below 300 µm).

It is a further object of this invention to provide an efficient method to select a target visual effect which is compatible with the above-mentioned reduced size(s).

SUMMARY OF THE INVENTION

According to one aspect the invention relates to an optical security element comprising a reflective light-redirecting surface, or refractive transparent or partially transparent light-redirecting surface, having a relief pattern operable to redirect incident light from a light source and form a projected image on a projection surface, the optical parameters of this optical security element fulfilling a specific projection criterion such that the projected image comprises a caustic pattern reproducing a reference pattern that is easily recognizable by a person, using no further means (i.e. with naked eye) or common and easily available means, so that an object marked with this optical security element can be readily authenticated visually by the person. A reduced thickness of the relief pattern of optical security element makes it particularly suitable for marking objects of reduced dimensions like banknotes or security documents (e.g. identity papers, passports, cards, etc.) for example. The transparent aspect of the refractive optical security element makes it particularly suitable for marking at least partially transparent substrates (e.g. glass or plastic bottles, bottle caps, watch glasses, jewelry, gems, etc.)

In view of the great difficulty to determine reference patterns that can be conveniently reproduced by a projected caustic pattern on a projection surface so as to be visually recognizable by a person, particularly when the relief pattern of the optical security element is very thin (i.e. typically with relief depth below 250 µm), another aspect of the invention relates to a method for efficiently designing a relief pattern of a light-redirecting surface of an optical security element based on a selection of a candidate digital image of a reference pattern to be reproduced by a projected caustic pattern according to a specific digital image selection test: in case the candidate digital image complies with the test requirements, it is possible to calculate a corresponding relief pattern having a specified depth and then machine a reflective light-redirecting surface, or a transparent or partially transparent light-redirecting surface of specified refractive index, to reproduce the calculated relief pattern and arrive at an optical security element that will fulfill the above mentioned projection criterion, thereby obtaining an optical security element that will provide, under appropriate illumination, a projected caustic pattern reproducing the reference pattern of the selected digital image that is easily visually recognizable by a person. This method is particularly efficient for designing very thin relief patterns convenient for visual authentication of marked objects (i.e. of depth less than or equal to 250 µm, or even less than or equal to 30 µm) and allows significantly accelerating the design process operations.

Thus, according to one aspect, the invention relates to an optical security element comprising a reflective light-redirecting surface, or a transparent or partially transparent light-redirecting surface of refractive index n, having a relief pattern of depth δ adapted to redirect incident light received from a point-like source, at a distance $d_s$ from the light-redirecting surface, and form a projected image containing a caustic pattern on a projection surface disposed at a distance $d_i$ from the light-redirecting surface, said caustic pattern reproducing a reference pattern, the optical security element being such that upon illumination by the light source of an area of value A of the relief pattern and delivering of an (average) illuminance value $E_A$ by the optical security element to the projection surface, an average illuminance value $E_{\alpha 1}$ over a circular area of value $\alpha_1$ selected within an area of the projected image on the projection surface fulfills the following projection criterion $E_{\alpha 1} \leq E_A (\frac{1}{2} + \alpha_0/\alpha_1 + \sqrt{\frac{1}{4} + \alpha_0/\alpha_1})$, with scaling area parameter $\alpha_0 = 4\pi d_i \delta$ for the reflective light-redirecting surface, or $\alpha_0 = 2\pi (n-1) d_i \delta$ for the refractive light-redirecting surface, and $\alpha_1$ is smaller than the area value A.

Preferably, in order to make for even easier operation of authentication by visual recognition of the reference pattern from the projected caustic pattern, a value of $d_i$ should be less than or equal to 30 cm and a value of the ratio $d_s/d_i$ should be greater than or equal to at least 5. Also preferably, the projection surface is flat.

In order to provide very thin optical security elements, the value of depth δ of the relief pattern can be less or equal than 250 µm, or even less or equal than 30 µm. Moreover, the optical security element may further have its relief pattern disposed over a flat base of an optical material substrate, an overall thickness of the optical security element being less or equal than 100 µm.

According to another aspect, the invention relates to a method for designing a relief pattern of depth less than or equal to a value δ of a reflective light-redirecting surface, or a transparent or partially transparent light-redirecting surface of refractive index n, adapted to redirect incident light received from a point-like source, at a distance $d_s$ from the light-redirecting surface, and form a projected image containing a caustic pattern on a projection surface disposed at a distance $d_i$ from the light-redirecting surface, so that upon illumination by the light source of an area of value A of the relief pattern and delivering of an illuminance value $E_A$ by the optical security element to the projection surface, an average illuminance value $E_{\alpha 1}$ over a circular area of value $\alpha_1$ selected within an area of the projected image on the projection surface fulfills the following projection criterion $E_{\alpha 1} \leq E_A (\frac{1}{2} + \alpha_0/\alpha_1 + \sqrt{\frac{1}{4} + \alpha_0/\alpha_1})$, with scaling area parameter $\alpha_0 = 4\pi d_i \delta$ for the reflective light-redirecting surface, or $\alpha_0 = 2\pi (n-1) d_i \delta$ for the refractive light-redirecting surface, and $\alpha_1$ is smaller than the area value A, said method comprising the steps of:

a) selecting a digital image of a reference pattern to be reproduced by the caustic pattern on the projection surface, the digital image comprising a total number of pixels $N_A$ and a sum of all pixel values over the digital image being $I_A$, by checking that each circular area of N pixels within the digital image, with N integer and $1 \leq N \leq N_A$, a value I(N) of a sum of each pixel value of the N pixels in the circular area is less than a value $I_{max}(N) = N (I_A/N_A) (\frac{1}{2} + N_0/N + \sqrt{\frac{1}{4} + N_0/N})$, wherein $N_0$ is a number of pixels given by $N_A(\alpha_0/A)$ within the digital image;

b) calculating a relief pattern of depth less than or equal to δ corresponding to the reference pattern on the digital image selected at step a); and c) machining a surface of an optical material substrate to form a light-redirecting surface reproducing the relief pattern calculated at step b), thereby obtaining an optical security element comprising said machined light-redirecting surface.

Preferably, the method also comprises a step of modifying a candidate digital image not fulfilling, or only partially fulfilling (i.e. fulfilling only for some circular areas of N pixels) the test (or selection criterion) that $I(N) < I_{max}(N)$, by adapting the pixel values where necessary, so as to fully comply with the test for any N, with $1 \leq N \leq N_A$. Thus, the step a) of selecting a digital image of a reference pattern may comprise a preliminary step of modifying a candidate digital image of the reference pattern of which a part does not fulfill the selection criterion that I(N) is less than $I_{max}(N)$, by adapting the pixel values within said part of the candidate digital image, by making said part of the candidate digital image with adapted pixel values to comply with the selection criterion for any N, with $1 \leq N \leq N_A$, thereby providing a modified candidate digital image to be selected. Adaptation of pixel values may also result from a filtering operation. Thus, the pixel values of the candidate digital image may be adapted by filtering with a filter the candidate image to reduce image contrast (e.g. a high-pass filter), the parameters (e.g. the cut-off frequency of the high-pass filter) of the filter corresponding to the selection criterion.

Thus, according to this variant of the invention, it is possible to transform an unsuitable target pattern, as represented on a digital image, into a suitable one with respect to the digital image selection criterion of the invention, which can be selected at subsequent step a).

At step c) of the method, the machining of the surface of the optical material substrate may comprise any one of ultra-precision machining (UPM), laser ablation, and lithography.

The machined light-redirecting surface according to the method may be a master light-redirecting surface to be used to build a replica by molding technique (or replicas for mass-production of optical security elements), and may be replicated on a substrate (for example, to form a marking applicable on an object). Replication of the machined light-redirecting surface may comprise any one of UV casting and embossing (e.g. in a roll-to-roll or foil-to-foil production process).

According to a further aspect, the invention relates to a method of visually authenticating an object, marked with an optical security element according to the invention, by a user, comprising the steps of:

illuminating the light-redirecting surface of the optical security element with a point-like light source (approximately) at a distance $d_s$ from the light-redirecting surface;

visually observing on the caustic pattern as projected on the projection surface at a distance $d_t$ from the optical security element; and deciding that the object is genuine upon evaluation by the user that the projected caustic pattern is visually similar to the reference pattern.

The present invention will be described more fully hereinafter with reference to the accompanying drawings in which like numerals represent like elements throughout the different figures, and in which prominent aspects and features of the invention are illustrated.

DETAILED DESCRIPTION

Figure 1:
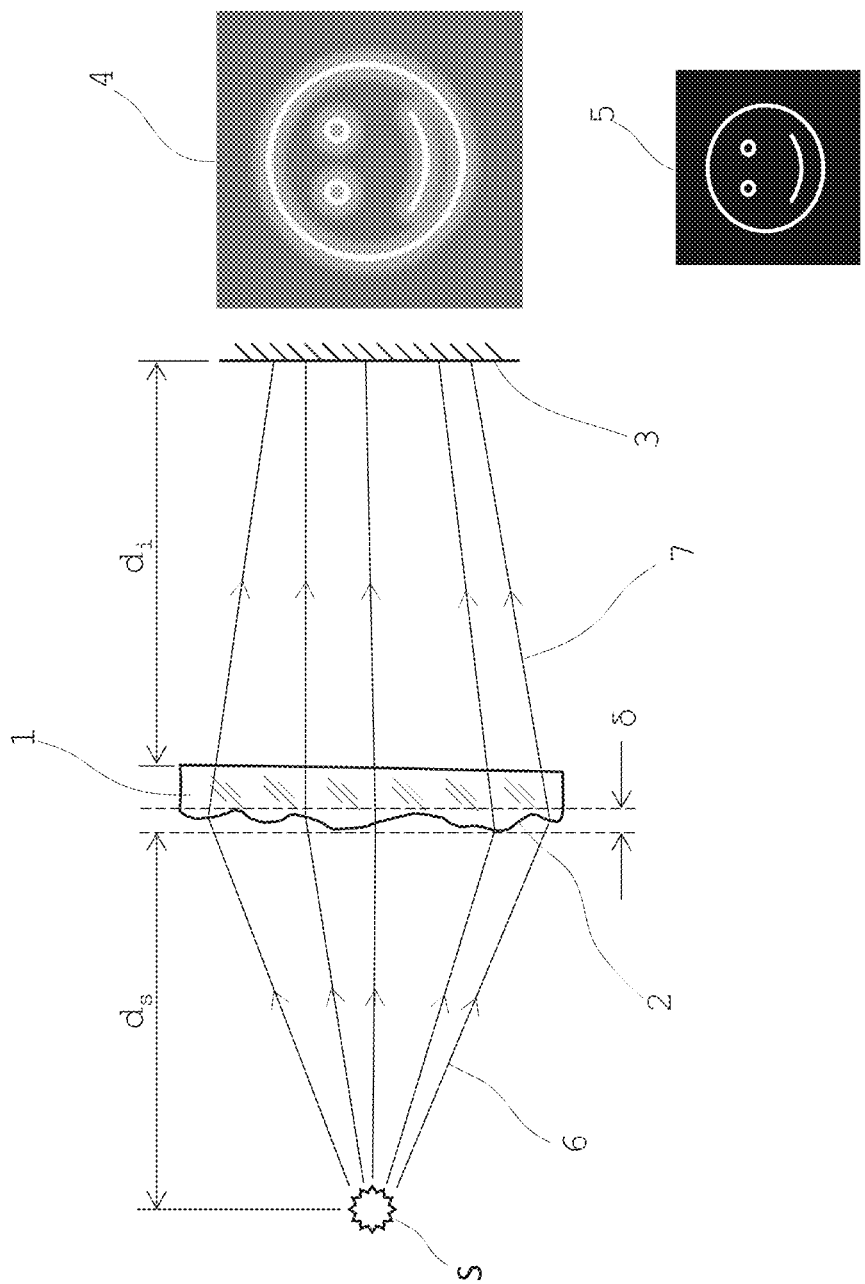
FIG. 1 is a schematic illustration of an optical configuration of a refractive optical element for projecting of a caustic pattern according to a preferred embodiment of the invention.

In optics, the term "caustic" refers to an envelope of light rays reflected or refracted by one or more surfaces, at least one of which is curved, as well as to projection of such light rays onto another surface. More specifically, a caustic is the curve or surface tangent to each light ray, defining a boundary of an envelope of rays as a curve of concentrated light. For example, the light pattern formed by sunrays at the bottom of a pool is a caustic "image" or pattern formed by a single light redirecting surface (the wavy air-water interface), whereas light passing through the curved surface of a water glass creates a cusp-like pattern on a table which the water glass is resting as it crosses two or more surfaces (e.g. air-glass, glass-water, air-water . . . ) which redirect its path.

In the following, the most common configuration where the (refractive) optical (security) element is bound by one curved surface and one flat surface will be used as an example, without restricting the more general cases. We will here refer to a more general "caustic pattern" (or "caustic image") as the light pattern formed onto a screen (projection surface) when a suitably shaped optical surface (i.e. having an appropriate relief pattern) redirects light from a source to divert it from some regions of the screen, and concentrate it on other regions of the screen in a pre-determined light pattern (i.e. thus forming said "caustic pattern"). Redirection refers to the change of path of light rays from the source in the presence of the optical element with respect to the path from the source to the screen in the absence of the optical element. In turn, the curved optical surface will be referred to as "relief pattern", and the optical element that is bound by this surface will be referred to as optical security element. It should be noted that the caustic pattern may be the result of redirection of light by more than one curved surface and more than one object, although possibly at the price of increased complexity. Moreover, a relief pattern for generating a caustic pattern must not be confused with a diffractive pattern (like, for example, in security holograms).

According to the invention, it was found that this concept may be for example applied to common objects, such as consumer products, ID/credit cards, banknotes, and so on. To do so, it is required drastically shrinking down the size of an optical security element, and in particular bringing the relief depth below acceptable values. Surprisingly, it was found that although the relief was strongly limited in depth, it was still possible to achieve an approximation of a selected (digital) image (representing a reference pattern) on a projection surface of a sufficient quality to allow visual recognition of the selected image from the visually observed caustic pattern on the projection surface (or screen). Such a recognition of a reference pattern directly from a mere visible caustic pattern on a screen, as projected from an optical security element of which design and machining are quite challenging (and thus, make very difficult counterfeiting), constitute a valuable security test allowing reliable authentication of an object marked with this optical security element.

In this description under "relief" should be understood the existence of a height difference (as measured along an optical axis of the optical security element) between the highest point and lowest point of a surface, in analogy with the difference of altitude between the bottom of a valley and the top of a mountain (i.e. as "peak to valley" scale). According to a preferred embodiment of the invention the maximum depth of the relief pattern of the optical security element is ≤250 μm or more preferably ≤30 μm, while being above the limit imposed by ultra precision machining (UPM) and reproduction process, i.e. about 0.2 μm. According to this description, the height difference between the highest and lowest point in the relief pattern on the light-redirecting surface is referred to as relief depth $\delta$.

In this description several terms are used, which are defined further below.

A caustic pattern (image), forming an approximation of a digital image, should be understood as a light pattern projected by an optical security element, when illuminated by a suitable (preferably, but not necessarily point-like) source. As mentioned above, the optical (security) element should be understood as the slab of refractive material responsible for creating the caustic image.

A light-redirecting surface(s) is the surface (or surfaces) of the optical security element responsible for redirecting the incoming light from a source onto a screen, or (preferably flat) projection surface, where the caustic pattern is formed.

An optical material substrate, used to make an optical (security) element, is a raw material substrate from which a surface is specifically machined so as to have a relief pattern and thus form a light-redirecting surface. In case of a reflective light-redirecting surface, the optical material substrate is not necessarily homogeneous or transparent. For example, the material may be opaque to visible light (reflectivity is then obtained by classical metallization of the machined surface). In case of a refractive light-redirecting surface, the raw material substrate is transparent (or partially transparent) and homogeneous with a refractive index n (for photons of the spectrum visible to a human eye), and the corresponding light-redirecting surface is named as the "refractive transparent or partially transparent light-redirecting surface of refractive index n".

A master according to this description is the first physical realization of a light-redirecting surface from a calculated profile (particularly, from a calculated relief pattern). It can be replicated into several copies (tools) which are then used for mass replication.

A point-like source as used in this description is a source of light whose angular size (from the point of view of the optical security element), is sufficiently small that light can be considered to arise from a single point at a distance $d_s$ from the light-redirecting surface. As a rule of thumb, this means that the quantity: (source diameter)×$d_i/d_s$, is smaller than the desired resolution (e.g. 0.05-0.1 mm) of the target caustic pattern on a projected image on the projection surface at a distance $d_i$ from the light-redirecting surface (see FIG. 1). The screen should be understood as the surface on which the caustic pattern is projected. The distance between source and the light-redirecting surface is also named as source distance $d_s$ and the distance between the light-redirecting surface and the screen is named as image distance $d_i$.

The term tool (or replication tool, when it is necessary to remove ambiguity) is mainly used for the physical object carrying the profile of a light-redirecting surface that is used for mass replication. It can be for example to produce a copy of a master surface (the original relief being reproduced, by embossing or injection, from the master carrying the corresponding inverted relief). For the tool used to machine the relief pattern of the light-redirecting surface, the term machining tool is used to remove ambiguity.

According to a preferred embodiment of the invention it is provided an optical security element (1) having reflective or refractive surfaces, to redirect light from a point-like source S and project it onto a suitable screen (3), which could be any (mostly flat) surface, or (flat part of) any object, etc. where a meaningful image is formed, as shown in FIG. 1. A special design of the light-redirecting surface may allow projecting a (recognizable) caustic pattern on a curved surface. The image could be for example a logo, a picture, a number, or any other information that may be relevant in a specific context. Preferably, the screen is a flat projection surface.

The configuration of FIG. 1 shows that light from a source S is redirected by a suitably shaped optical surface having a relief pattern (2). This general idea is for example known from reflective surfaces for car headlights, reflectors and lenses for LED illumination, optical systems in laser optics, projectors and cameras: however, usually, the goal is to transform a non-homogeneous distribution of light into a homogeneous one. By contrast, a goal of the invention is to obtain a non-homogeneous light pattern, i.e. a caustic pattern, which (approximately) reproduces some regions of relative brightness of a reference pattern (as represented on a (digital) reference image): if the illuminated relief pattern (2) of the optical element allows forming a caustic pattern (4) on the screen (3) reproducing with sufficient quality (possibly differing by an overall intensity scaling factor) a known reference pattern (5), then a person visually observing the caustic pattern on the screen will easily see if it constitutes or not a valid reproduction of the reference pattern and, in case the caustic pattern is similar enough to the reference pattern, will consider that the object marked with the optical security element is (most probably) genuine.

According to the embodiment of FIG. 1 light rays (6) from a light source S, which is a point-like source according to this example, propagate to an (refractive) optical security element (1) at a source distance $d_s$ with a light-redirecting surface having a relief pattern (2). The optical security element is here made of a transparent or partially transparent homogeneous material of refractive index n. A so called caustic pattern (4) is projected on a screen (3) at an image distance $d_i$ from the light-redirecting surface of the optical security element (1). Authenticity of the optical security element (and thus, that of the object marked with this security element) can be evaluated directly by visually checking a degree of resemblance between the projected caustic pattern and the reference pattern.

Preferably, the relief pattern (2) is first calculated starting from a specified target digital image. Methods for such calculations are, for example, described in the European patent applications EP 2 711 745 A2 and EP 2 963 464 A1. From that calculated relief pattern, a corresponding physical relief pattern can be created on a surface of suitable optical material substrate (e.g. a transparent or partially transparent material of refractive index n, or a reflective surface of opaque material), using Ultra Precision Machining (UPM). In case of machining a relief on a surface of an opaque optical material substrate to form a reflective surface, a good reflectivity will be obtained by a further conventional operation of depositing a thin layer of metal (metallizing) on the relief. UPM uses diamond machining tools and nanotechnology tools to achieve very high accuracy so that the tolerances can reach "sub-micron" level or even nano-scale level. In contrast to this, "High Precision" in traditional machining refers to tolerances of microns in the single-digits. Other potentially suitable techniques to create a physical relief pattern on a surface are laser ablation, and grayscale lithography. As known in the domain of microfabrication, each of these techniques has different strengths and limitations, in terms of cost, precision, speed, resolution, etc. Generally, a calculated relief pattern for generating a caustic pattern has a smooth profile (i.e. without discontinuities) with a typical depth of at least 2 mm, for an overall size of 10 cm×10 cm.

A suitable optical material substrate for a refractive light-redirecting optical element should be optically clear, transparent or at least partially transparent, and mechanically stable. Typically a transmittance T≥50% is preferred, and T≥90% is most preferred. Also, a low haze H≤10% can be used, but H≤3% is preferred and H≤1% is most preferred. The optical material should also behave correctly during the machining process, so as to give a smooth and defect-free surface. An example of a suitable substrate is an optically transparent slab of PMMA (also known under the commercial names of Plexiglas, Lucite, Perspex, etc.). For reflective caustic light-redirecting optical elements, a suitable optical material substrate should be mechanically stable, and it should be possible to give it a mirror-like finish. An example of a suitable substrate is a metal, such as those used for masters of ruled gratings, and laser mirrors, or a non-reflective substrate which can be further metallized.

For large scale production, further steps of tool creation and mass replication of the optical security element on a target object are required. A suitable process for tool creation from a master is, e.g. electroforming. Suitable processes for mass replication are, e.g. hot embossing of a polymer film, or UV casting of a photo-polymer. Note that for the purpose of mass replication neither the master nor the tool derived from it need to be optically transparent, hence opaque materials (notably, metals) can also be used even when the final product is a refractive optical element. Nevertheless, in some cases it might be advantageous that the master is transparent, as it allows checking the quality of the caustic image before proceeding with tooling and mass replication.

A critical aspect for the use of optical elements (with light-redirecting surface having relief pattern) as security features is their physical scale, which must be compatible with the target object, and the optical configuration required to project the caustic image.

In general, for this kind of use the maximum lateral size is limited by the overall size of the object and may usually range from a few cm to less than 1 cm in less favorable cases. For certain uses, like for example for banknotes, the targeted overall thickness can be extremely small (of the order of 100 μm or less). Furthermore, admissible thickness variations (relief) are even smaller, for a variety of reasons, including mechanical constraints (weak spots associated with the thinner areas) and operational considerations (e.g. when stacking-up banknotes, the pile will bulge corresponding to the thicker portion of the bill, which complicates handling and storage). Typically, for a banknote of overall thickness of about 100 μm, a target thickness for the relief pattern of an optical security element to be included in this banknote may be of about 30 μm. For a credit card or an ID card of about 1 mm thickness, a target thickness for the relief pattern of an optical security element to be included in this credit/ID card will be less than about 400 μm and preferably no more than about 250 μm.

Furthermore, the source- and image-distance, are generally limited by user comfort to a few tens of centimeters. Notable exceptions are the sun or a spot light mounted on the ceiling, which however are less readily available under certain circumstances. Also, the ratio $d_s/d_i$ between the two distances is typically larger than 5 to 10, so as to obtain a sharper image (and with good contrast) that is easier to recognize. Moreover, the ratio $d_s/d_i \geq 5$ together with a light source S being preferably point-like (e.g. illumination LED of a conventional mobile phone) allows considering that the light source is in fact approximately "at infinity" and thus, a projection surface at only approximately the focal distance from the optical security element will be suitable for a clear viewing of a projected caustic pattern. As a consequence, the conditions of good visual observation by a user do not require a too strict relative spatial arrangement of the light source, the optical security element and the user's eyes.

In general, thickness and relief are among the most critical parameters. Given an arbitrary target image (reference pattern) and optical geometry configuration (i.e. geometric conditions for illumination/observation of the projected caustic pattern), there is no guarantee that the calculated optical surface will have a relief pattern below a prescribed limit. In fact, in the general case, the opposite is likely to happen: this is particularly true with the severe imposed constraints for optical security elements described above. Given that numerical simulations to optimize optical surfaces are expensive in terms of time and resources, excessive trial-and-error is not a viable option, and it is highly desirable to ensure that one can obtain a useful result at the first attempt—or at least with only a small number of attempts. It is also highly desirable not to be limited in the choice of a target image, as not all target images are compatible with smooth relief patterns of low depth.

It was found, after numerous tests, that this can be achieved with a careful choice of the optical geometry configuration and, especially, of the target caustic pattern, in view of depth constraint. Given the following parameters (see FIG. 1):

the image distance: $d_i$ the source distance: $d_s$ the area of the light-redirecting surface (cross-sectional area): A the illuminance delivered by the light-redirecting surface to the projection surface, upon illumination of the optical security element by the source S: $E_A$; this means that the illuminance delivered to the projection surface, when averaged over an area corresponding to the projection of the cross section of the light-redirecting surface (i.e. its geometrical shadow), has an average value equal to $E_A$ the target relief pattern (maximal) depth: δ the refractive index of the optical security element: n (in case of a refractive light-redirecting surface), the optimized choice of the target caustic image (that will allow providing a convenient optical security element with light-redirecting surface having a corresponding relief pattern within depth δ) is such that for a point source located at "infinity" (i.e. in practice for $d_s \gg d_i$, with at least $d_s \geq 5\ d_i$), with a scaling area parameter $\alpha_0$ defined by the relation $\alpha_0 = 2\pi (n-1)\ d_i\ \delta$ in the case of a refractive optical element of refractive index n, or $\alpha_0 = 4\pi\ d_i\ \delta$ in case of a reflective surface of an optical element, for any circular area $\alpha_1$ of the caustic image on the projection surface (3) (with $\alpha_1 < A$), a quantity $E_{\alpha 1}$, corresponding to an illuminance averaged over the circular area $\alpha_1$ on the projection surface (3) (preferably disposed in a focal plane of the optical security element), should satisfy the following projection criterion:

$$E_{\alpha 1} \leq E_A (\tfrac{1}{2} + \alpha_0/\alpha_1 + (\tfrac{1}{4} + \alpha_0/\alpha_1)^{1/2}).$$

In practice, with a given value of $\alpha_1$ (being at least above a resolution area when observing the caustic pattern on the screen, knowing that a typical resolution length in the visible spectrum for a human eye is of about 80 μm), it suffices to scan across the area of the projected image with a viewing window of area $\alpha_1$ and check that corresponding illuminance $E_{\alpha 1}$ indeed satisfies the above projection criterion. Moreover, it is even not mandatory to effectively realize a candidate (target) relief pattern by machining a profile of a light-redirecting surface, perform the illumination of the optical element and then scan the projected image on the screen with viewing window of area $\alpha_1$ in order to check if the projection criterion is indeed fulfilled: a mere simulation (for example, via ray tracing) of the scanning operation with test area $\alpha_1$ across the distribution of the optical rays on the projection surface, corresponding to the given parameters ($d_s$, $d_i$, A, n (in the case of a refractive light-redirecting optical security element), δ, $E_A$) and given target profile of the relief pattern, will provide a reliable check with respect to the projection criterion. Moreover, in case the projection criterion is not fulfilled only in some particular sub-area of the projected image, is it quite easy to locally adapt a corresponding part of the target profile to correct this deficiency (this is equivalent to slightly modifying the corresponding reference pattern).

However, even such a simulation-adaptation phase (although already much less expensive than the conventional method) can be avoided. Indeed, according to another aspect of the invention, a method is provided which allows selecting a target relief pattern profile directly from a digital image of a reference pattern, from which a physical optical security element (with light-redirecting surface having a corresponding relief pattern of given depth) fulfilling the projection criterion can readily be obtained. This method of designing a relief pattern of depth δ of a reflective light-redirecting surface, or a refractive transparent or partially transparent light-redirecting surface of refractive index n, to provide an optical security element fulfilling the above mentioned projection criterion, is based on a specific digital image test criterion, that has been tested and has proven to be very effective, that is implemented merely on the digital image of the reference pattern that a corresponding caustic pattern generated by the optical security element should reproduce (upon proper illumination/projection on a screen).

Indeed, it has been observed that if a digital image of a candidate reference pattern to be reproduced by a caustic pattern on the projection surface, as generated by an optical security element fulfilling the projection criterion (and thus, with given parameters $d_s$, $d_i$, n (in the case of a refractive optical security element), $\delta$, $\alpha_0$, A and $E_A$), has a total number of pixels $N_A$ and a sum of each pixel value over the digital image has a value $I_A$, then if for each substantially circular area composed of N pixels within the digital image (N integer and $1 \leq N \leq N_A$) a value I(N) of the sum of each pixel value of the N pixels in the circular area is less than a value $I_{max}(N) = N (I_A/N_A) (\frac{1}{2} + N_0/N + \sqrt{(\frac{1}{4} + N_0/N)})$, wherein $N_0$ is a number of pixels given by $N_A(\alpha_0/A)$ within the digital image, the candidate reference pattern will be convenient for effectively designing the optical security element capable to fulfill the projection criterion.

The above selection test of scanning a candidate digital image of a reference pattern with a viewing window of variable size of N pixels (N varying up to $N_A$) and checking that a "window intensity" I(N) is less than a certain maximum value $I_{max}(N)$ for a set of N pixels, is quite easy to implement on a processor (in a memory of which the candidate digital image is stored) and corresponding execution of digital image processing gives a fast response for the full scanning of the digital image, thus considerably simplifying and accelerating the operations of designing an optical security element fulfilling the projection criterion, that is allowing a person observing the caustic pattern generated by this optical security element to easily decide whether an object marked with this optical security element is genuine or not.

Figure 2:
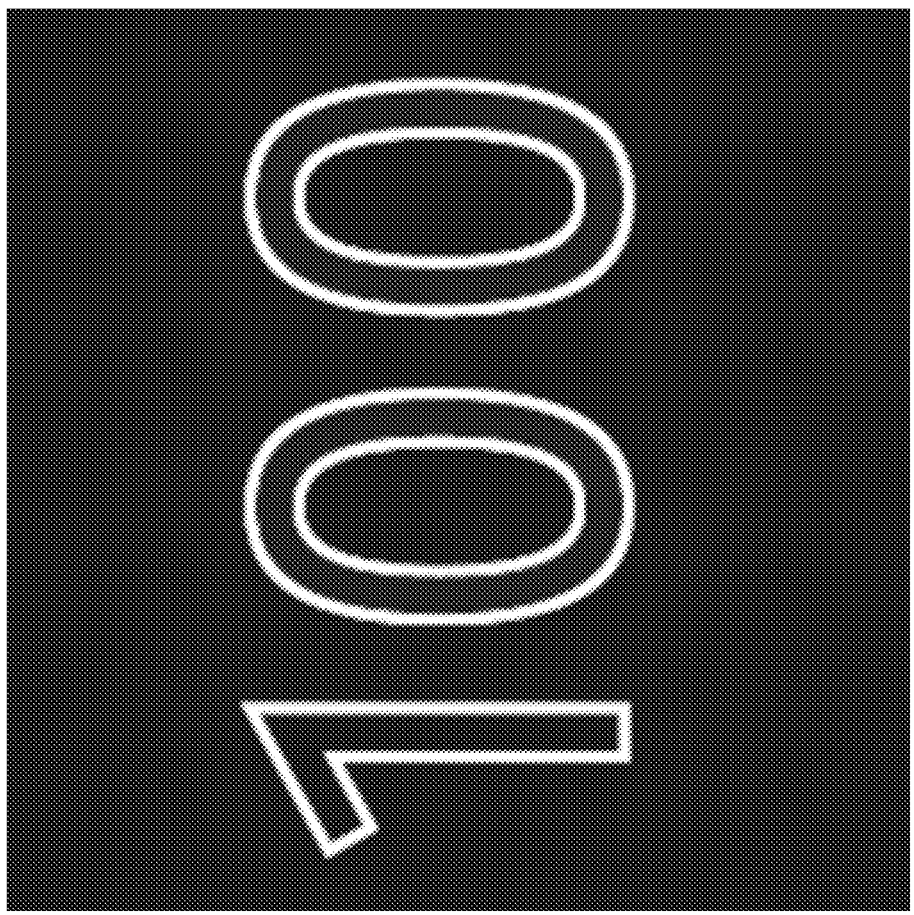
FIG. 2 illustrates a reference pattern on a candidate digital image representing the number 100.
Figure 2A:
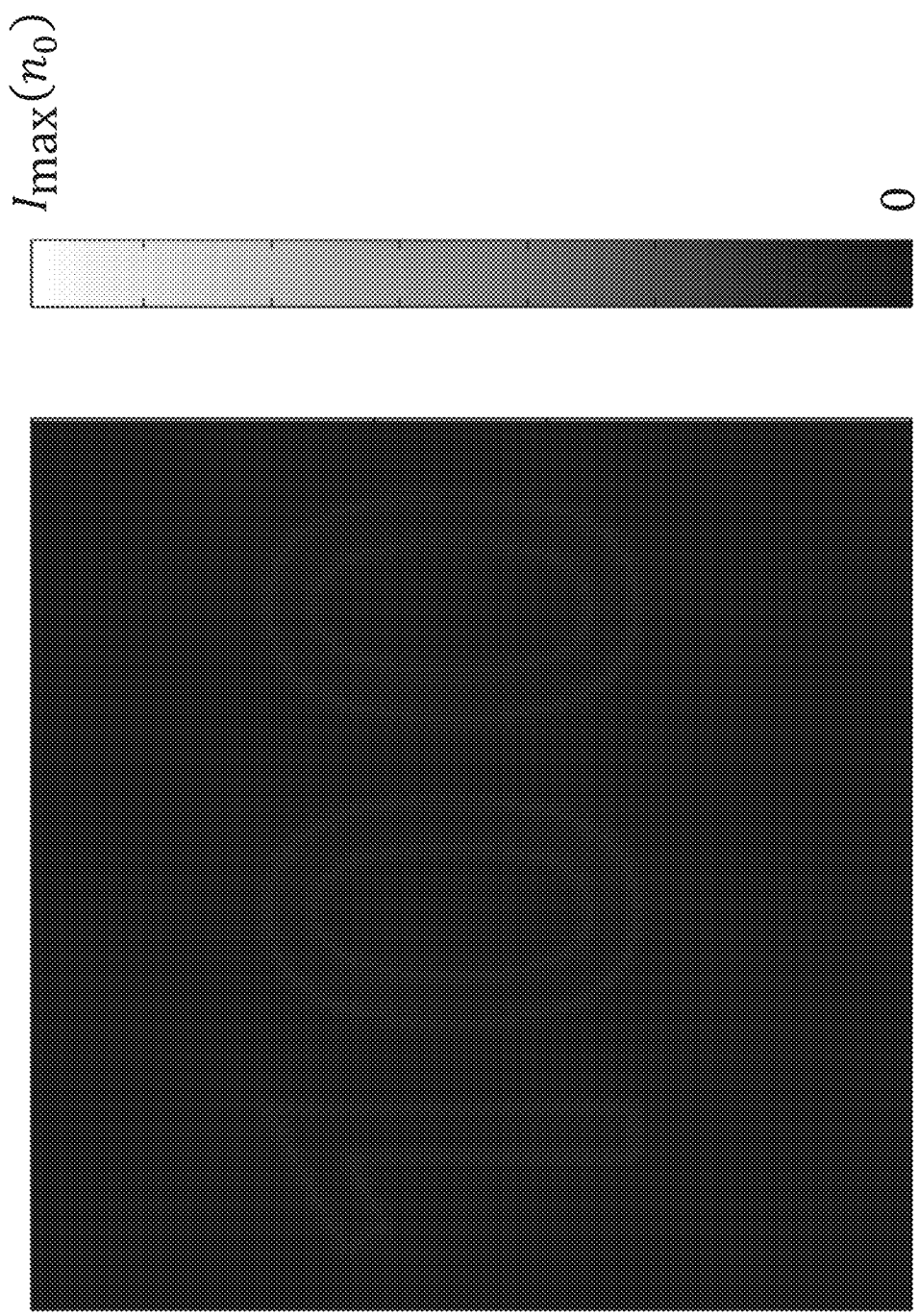
FIG. 2A-2E illustrate a selection of a digital image of the reference pattern of FIG. 2 according to the invention, and show the results of scanning the candidate digital image of FIG. 2 with different scanning windows.
Figure 2B:
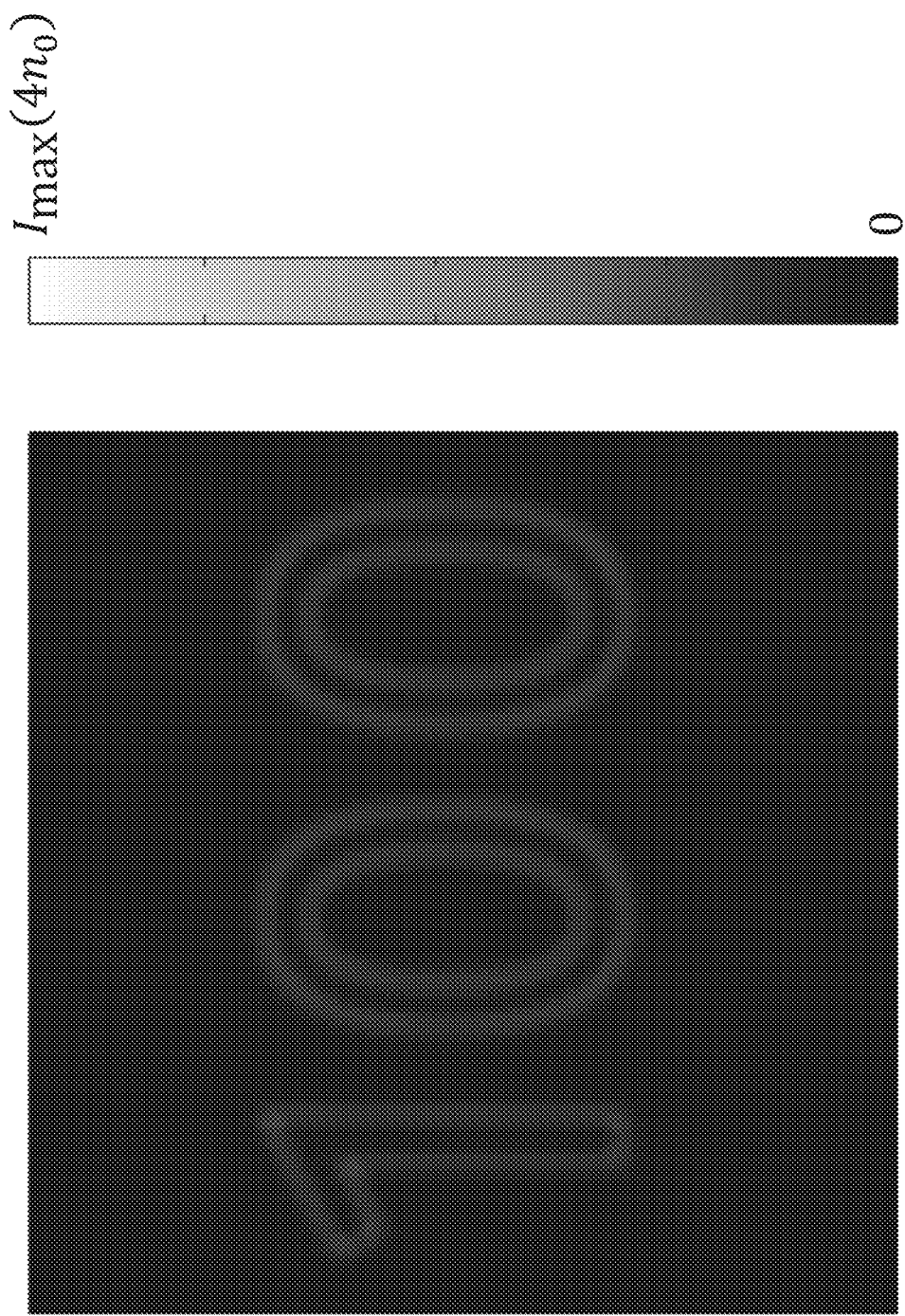
Figure 2C:
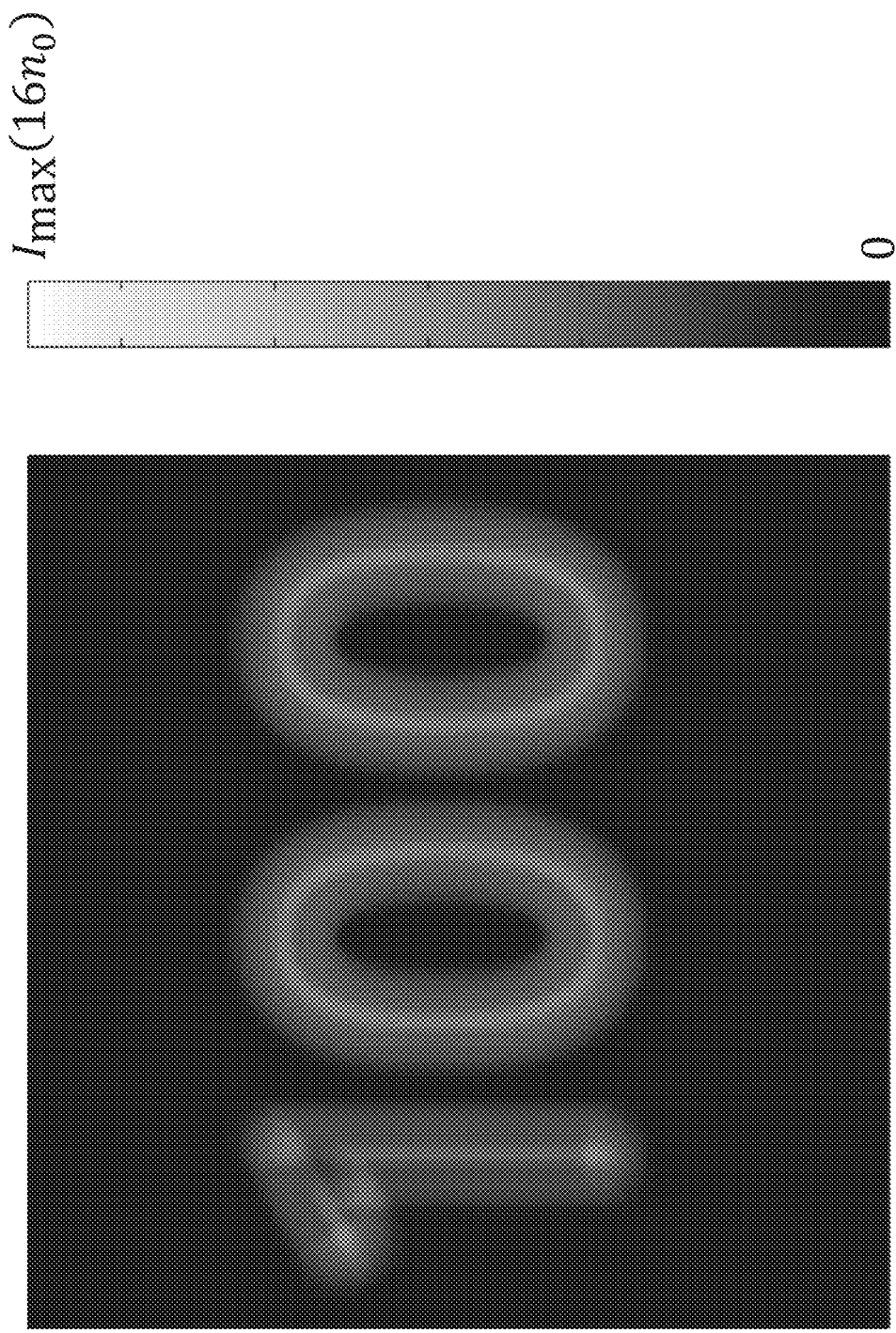
Figure 2D:
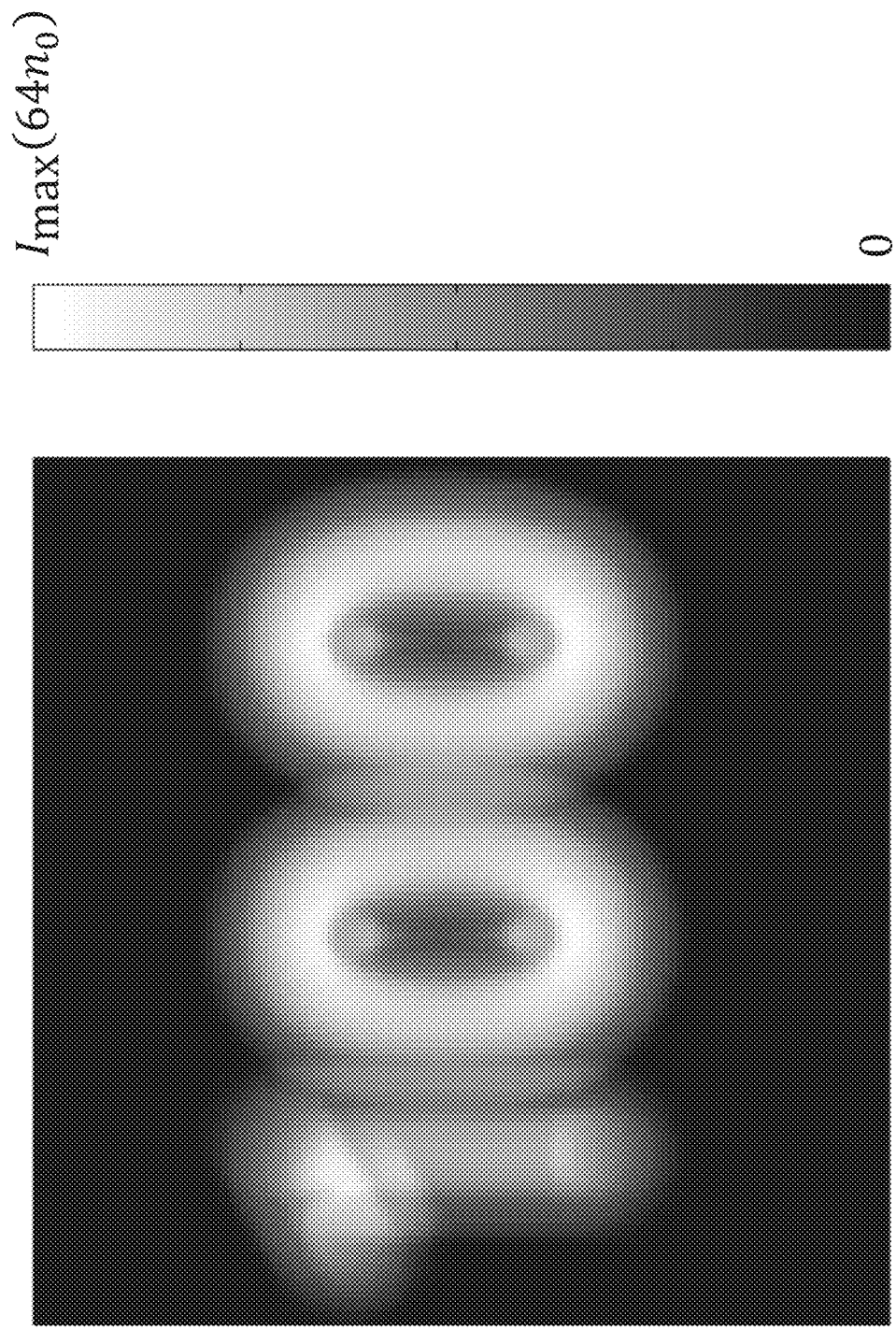
Figure 2E:
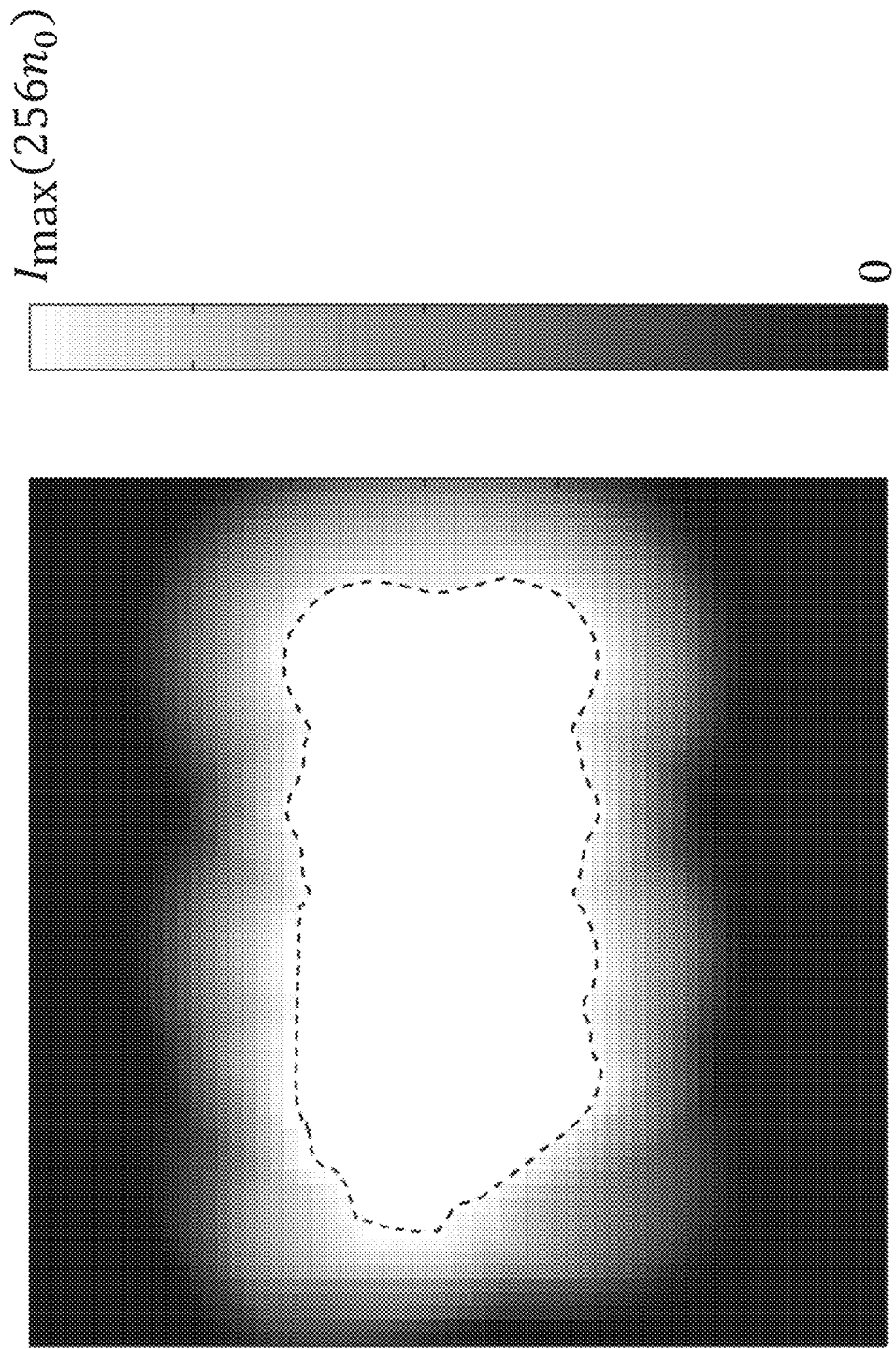

Moreover, a further advantage of the above method is that it is quite easy to modify a specific part of a candidate digital image of a reference pattern that fails fulfilling the selection test (for some value(s) of N) $I(N) < I_{max}(N)$: it suffices changing the values of the pixels of the set of N pixels within said specific part of the digital image so that the accordingly modified intensity I'(N) (i.e. sum of the modified pixel values within the scanning window of N pixels) pass the selection test. This, modification is also easy to implement on a processor having the initial candidate digital image stored in its memory. Thus, the invention allows easily adapting a given candidate digital reference pattern so as to provide a transformed digital reference pattern complying with the requirements regarding the selection test $I(N) < I_{max}(N)$ for at least some values of N between 1 and $N_A$. For example, as illustrated on FIG. 2A-2E and FIG. 3A-3E with the following values of parameters: A=1 cm×1 cm, $d_s$=30 cm, $d_i$=4 cm, (maximal depth) $\delta$=30 μm and n=1.5, the scanning windows used for testing the digital image can respectively comprise some multiples of $n_0$ (which may be related to e.g. the image resolution, and may correspond to a fraction of the number of pixels given by $N_A(\alpha_0/A) \approx 0.038 N_A$ within the digital image, corresponding to a (substantially) circular area, in pixels, corresponding to the parameter $\alpha_0$ relating to the target optical security element). In order to extend the scanning to the edge of the image, appropriate boundary conditions may be imposed, such as e.g. reflection boundary conditions, where the image is extended beyond the edge by imposing mirror symmetry of the extension with respect to the edge. FIG. 2 illustrates a reference pattern on a candidate digital image representing the number 100 (over a dark background) and having $N_A$=1024×1024 pixels. FIGS. 2A, 2B, 2C, 2D and 2E show the results of scanning the candidate digital image with scanning (circular) windows W1, W2, W3, W4 and W5 of respectively N=$n_0$, $4n_0$, $16n_0$, $64n_0$ and $256n_0$ pixels, with $n_0$=314 (here, $N_0$=3.9 $10^4$) each scanned image being represented on a normalized grey scale from 0 to $I_{max}(N)$ (a grey scale bar is shown on the right of FIG. 2A-E, with pixel values zero for black, corresponding to I(N)=0, to 255 for white, corresponding to $I(N)=I_{max}(N)$). The size of the physical (projected) image is 10 mm×10 mm, a pixel size corresponding approximately to 0.0098 mm. It is clear that the scanned image on FIG. 2D barely pass and that on FIG. 2E fails fulfilling the selection test $I(N) < I_{max}(N)$, as in zones corresponding to each one of the figures of the number 100 in FIG. 2D with respective defined perimeters represented by dashed contours, and in a whole central part of FIG. 2E with defined perimeter shown with dashed contour, the values of I(N) reach $I_{max}(N)$ (they appear as white zones). Thus, candidate image of FIG. 2 is not suitable to obtain an optical security element with low relief (here $\delta$=30 μm).

Figure 3:
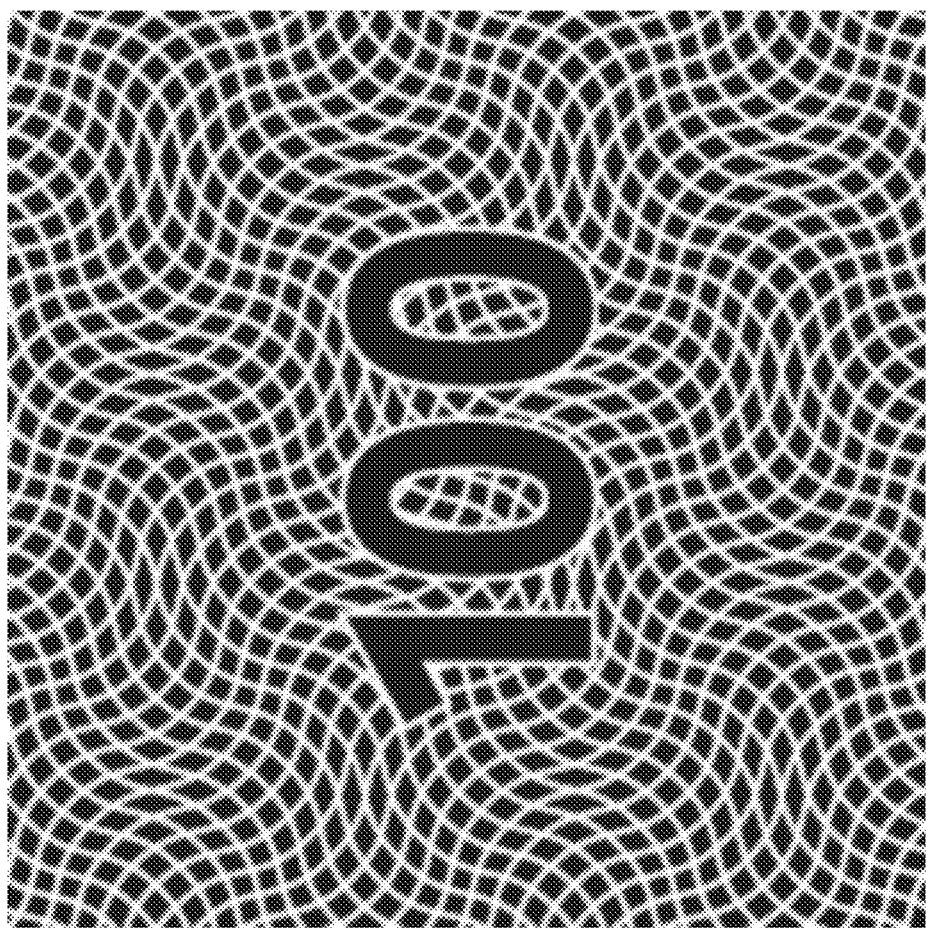
FIG. 3 is an example of reference pattern.
Figure 3A:
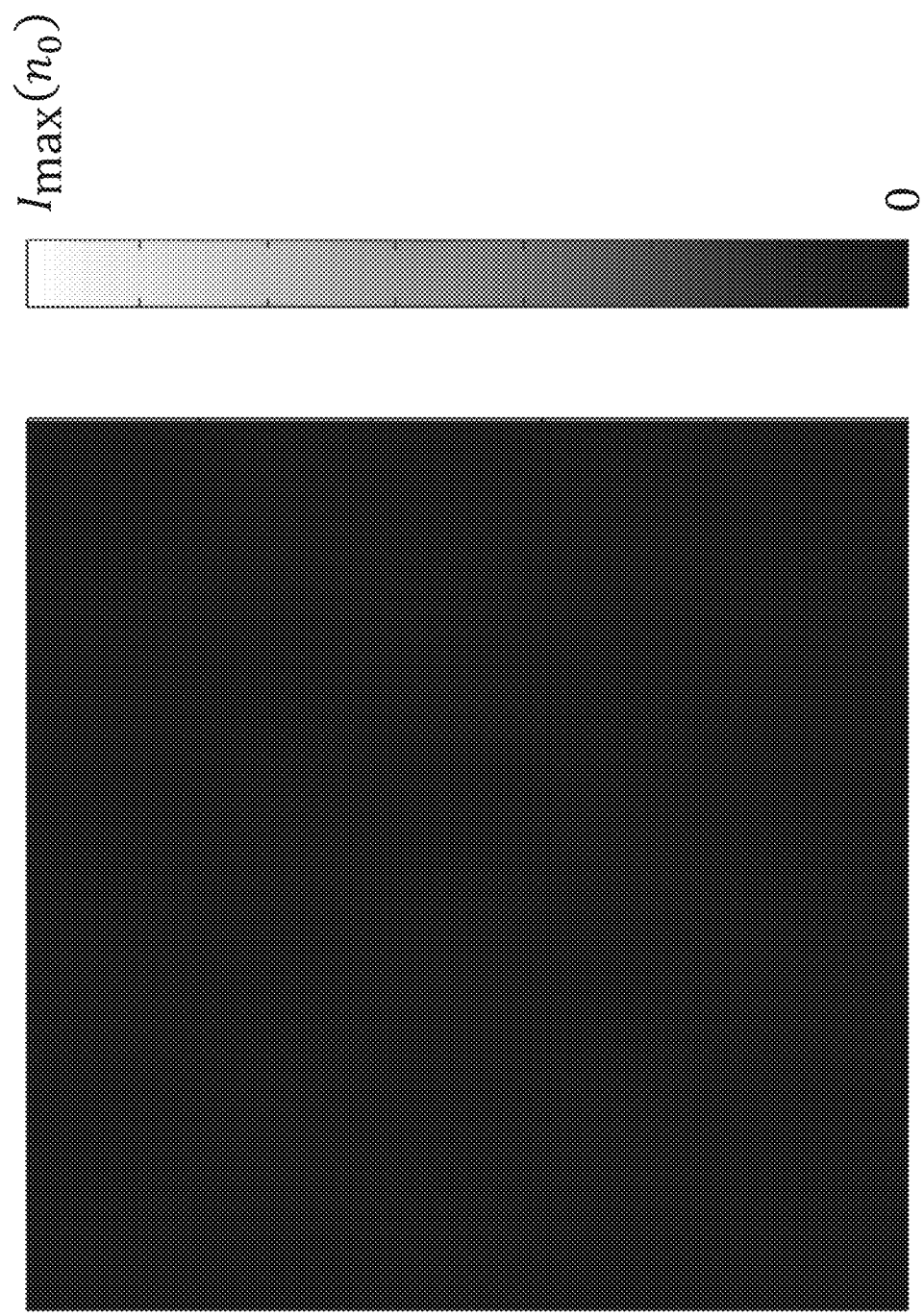
FIG. 3A-3E is a further illustration of a selection of a digital image of the reference pattern of FIG. 3 according to the invention, and show the results of scanning the candidate digital image of FIG. 3 with different scanning windows.
Figure 3B:
Figure 3B:
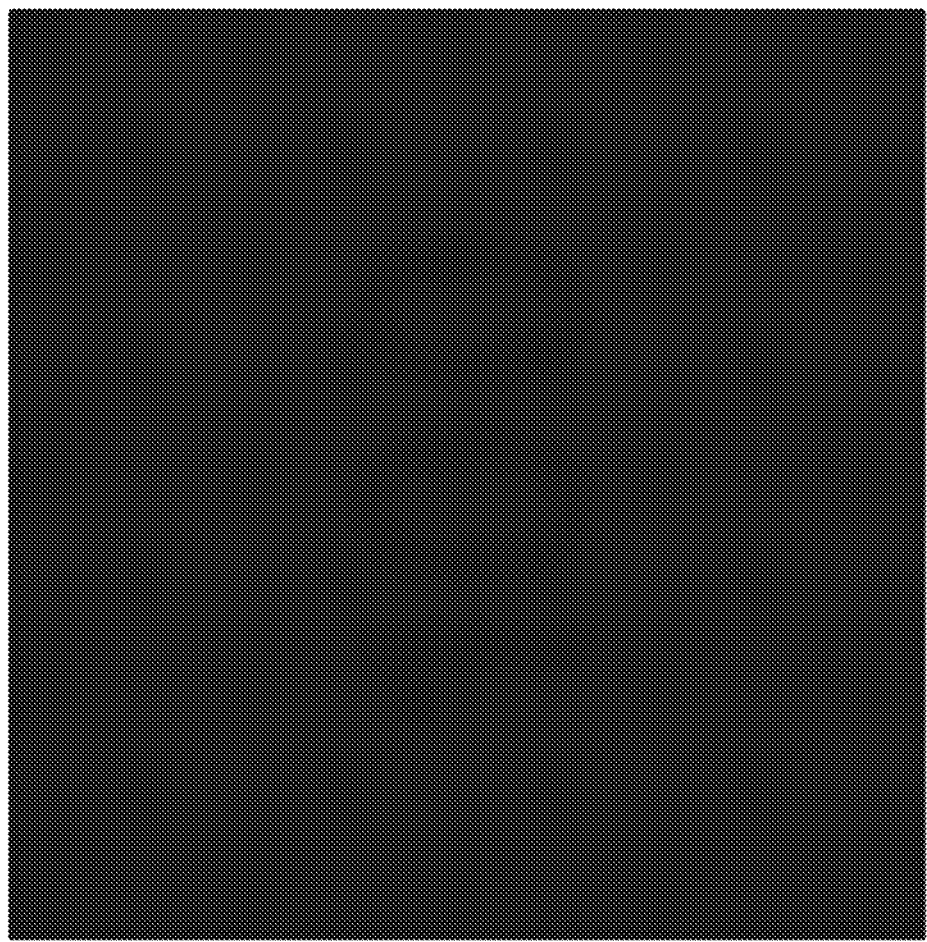
Figure 3C:
Figure 3C:
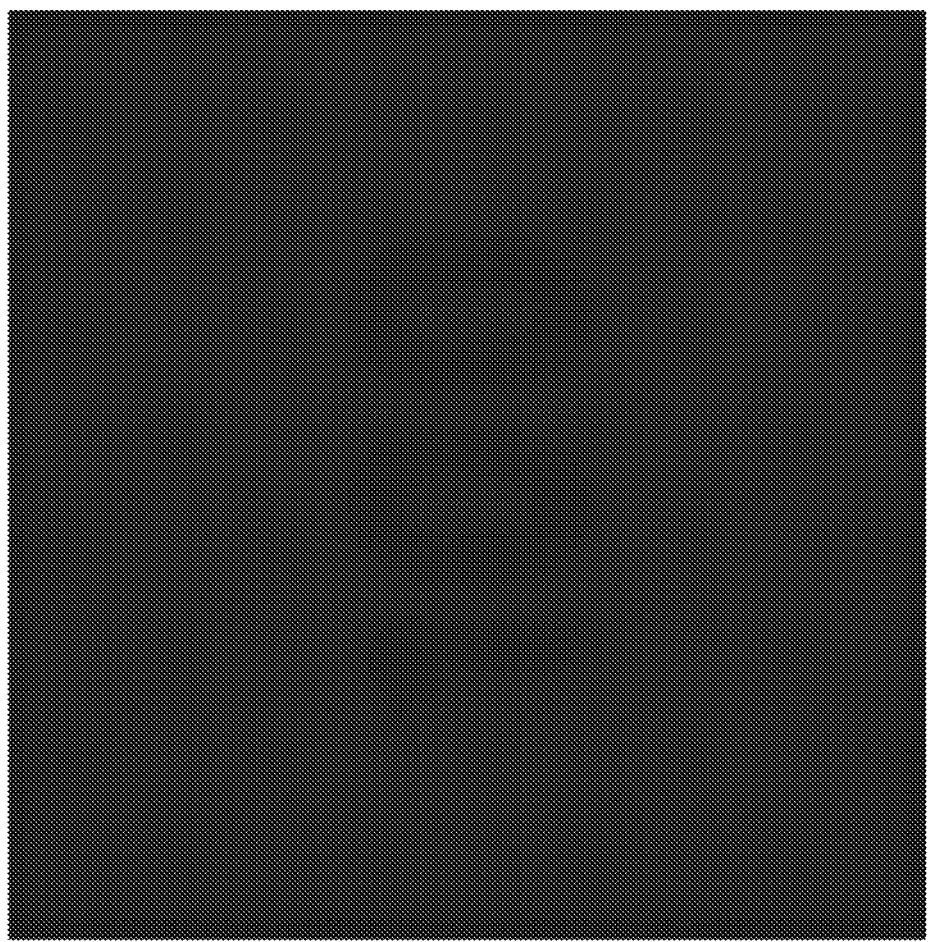
Figure 3D:
Figure 3D:
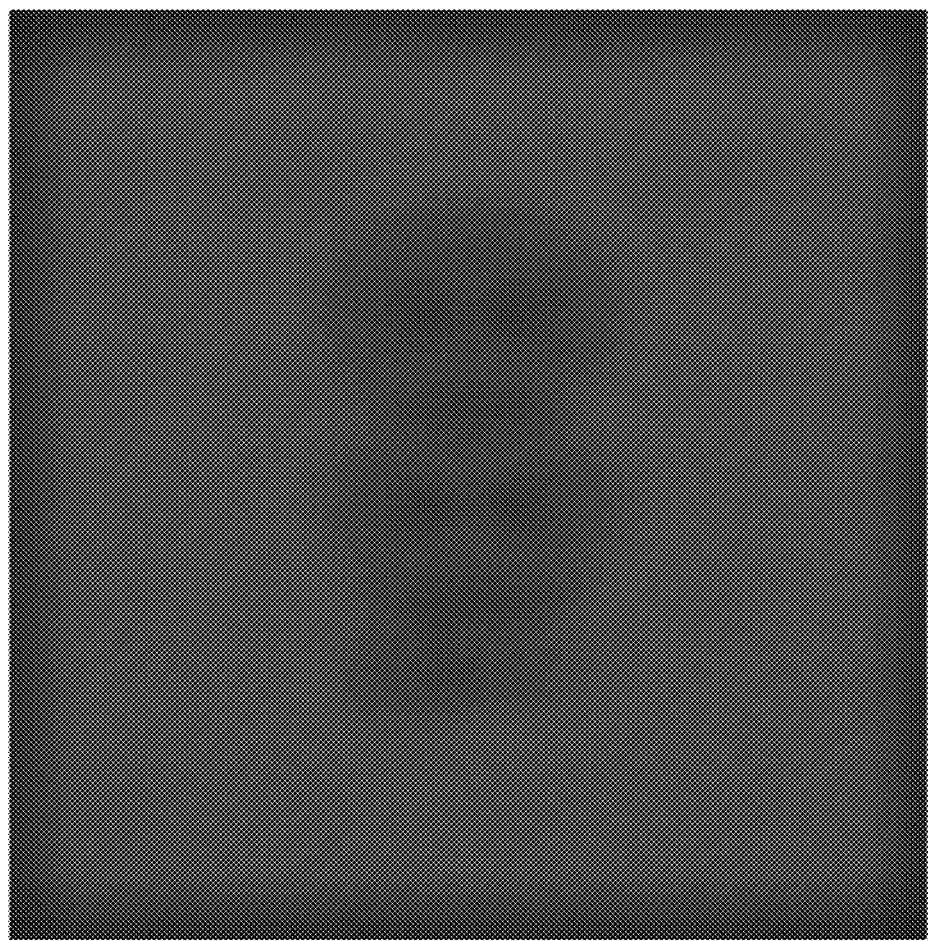
Figure 3E:
Figure 3E:
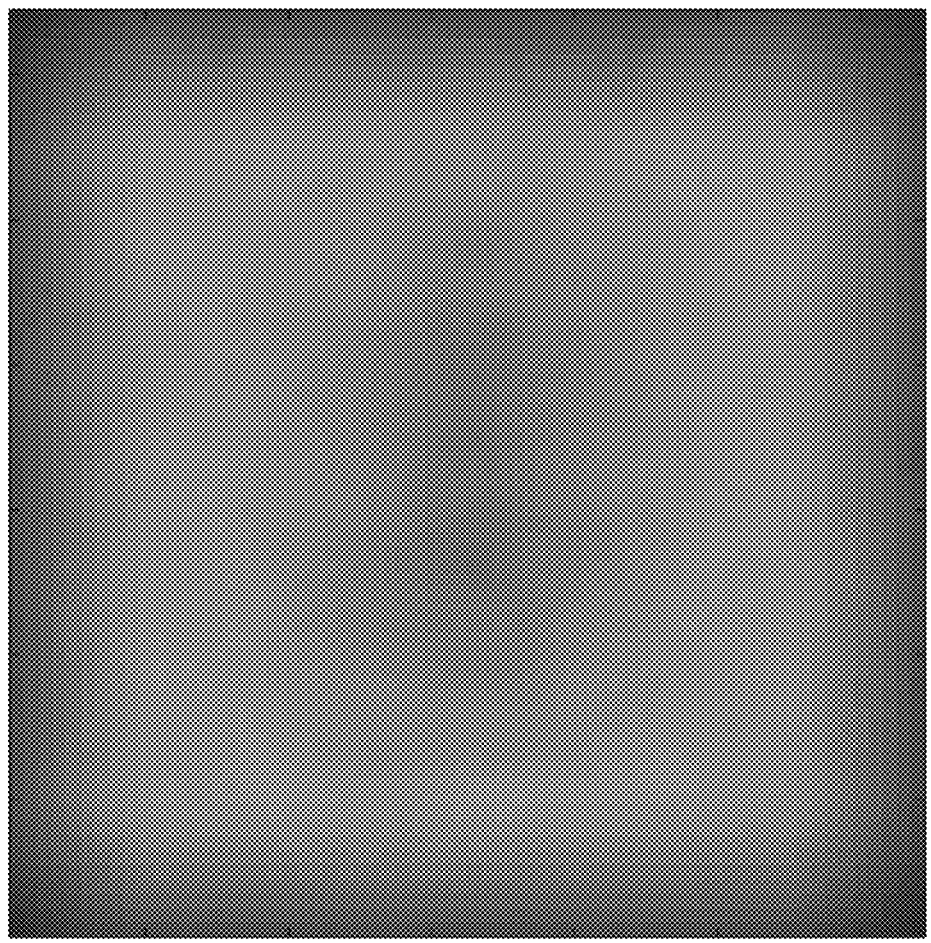

By contrast, the reference pattern on a candidate digital image representing the number 100, but with additional lines drawn in the background (i.e. guilloche intaglio-like pattern), as shown in FIG. 3 (with same values of the parameters as in FIG. 2) succeeds fulfilling the selection test $I(N) < I_{max}(N)$, as it is clear from FIGS. 3A, 3B, 3C, 3D and 3E which show the results of scanning the candidate digital image with scanning (circular) windows of respectively N=$n_0$, $4n_0$, $16n_0$, $64n_0$ and $256n_0$ pixels, each scanned image being represented on a normalized grey scale from 0 to $I_{max}(N)$ (a grey scale bar is shown on the right of FIG. 3D, with pixel values zero for black to 255 for white): there is no zone wherein I(N) reaches the value $I_{max}(N)$ (there is no part of the images having a defined perimeter surrounding a white zone).

According to a preferred variant of the invention, it has been successfully tested that instead of modifying pixel values within a specific part of a candidate digital image of a reference pattern that fails fulfilling the selection test, a filtering operation is applied globally to the candidate image to reduce image contrast where parameters of the filter are adapted to the projection criterion (e.g. with a high-pass filter with the cut-off frequency is adapted to the reference pattern).

The above new method thus enables efficiently selecting a convenient reference pattern, by scanning a digital image of this reference pattern according to a specific selection criterion relating image pixel values, or modifying an unsuitable candidate reference pattern so as to arrive at an appropriate one, for calculating a corresponding relief pattern that will be reproduced by accordingly machining a profile of a surface of an optical material substrate to form a light-redirecting surface of an optical element, and arriving at an optical security element that, in spite of a very low relief depth and reduced size, can still meet the projection criterion.

Thus, according to the invention, the operations of designing a relief pattern of given (very low) depth to form a light-redirecting surface on an optical material substrate, so as to provide an optical security element capable to meet the above-mentioned projection criterion (corresponding to a set of values of the parameters $d_s$, $d_i$, (maximal depth) $\delta$, A, $E_A$, n (in the case of a refractive optical security element) comprises the steps of:

i) selecting a convenient reference pattern by scanning a digital image of this reference pattern according to the specific selection criterion $I(N)<I_{max}(N)$ ($1 \leq N \leq N_A$), with $I_{max}(N)=N$ $(I_A/N_A)$ $(\frac{1}{2}+N_0/N+\sqrt{(\frac{1}{4}+N_0/N)})$, $N_0$ being a number of pixels given by $N_A(\alpha_0/A)$ within the digital image;

ii) calculating a relief pattern of depth less or equal than $\delta$ that corresponds to the selected reference pattern at step i); and iii) machining a surface of the optical material substrate to form a light-redirecting surface having the relief pattern of depth value calculated at step ii). The resulting optical security element can then be used for visual authentication purposes.

Figure 4A:
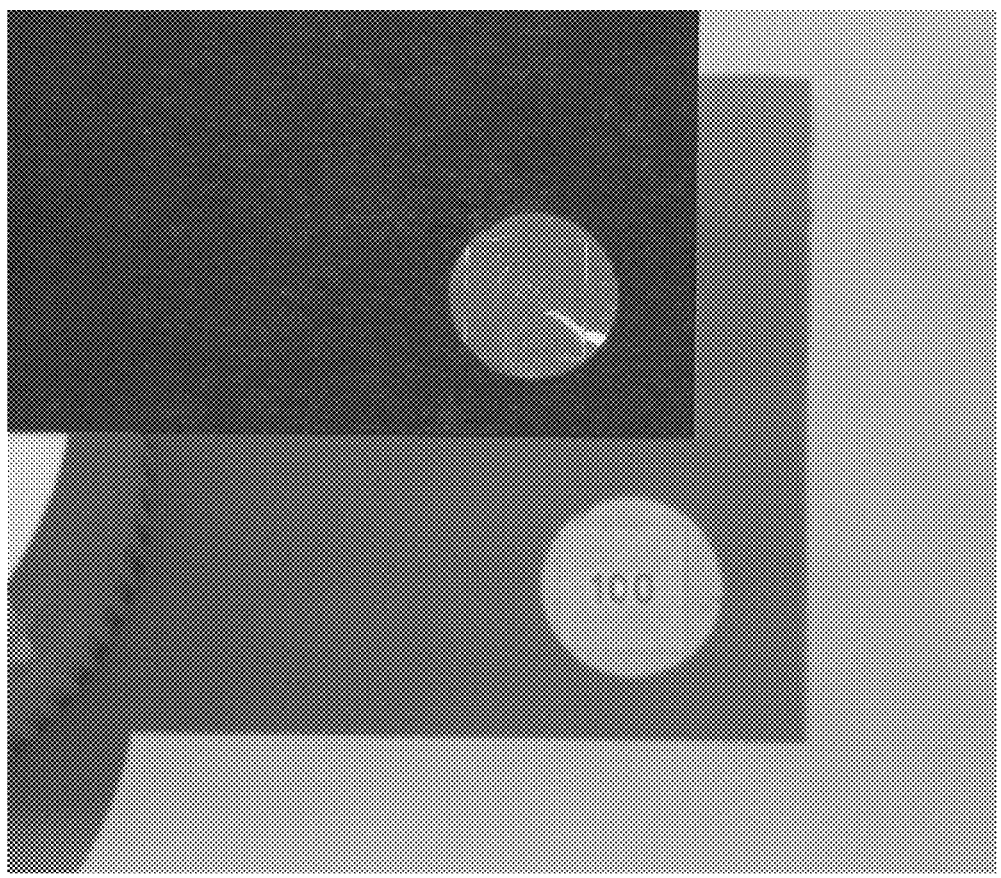
FIG. 4A is a view of a thin transparent refractive optical security element cast on a foil substrate (foreground) together with a corresponding projected caustic pattern (background).

FIG. 4A shows a photograph of a realization of a very thin optical security element (i.e. the transparent part of front image) having a refractive light-redirecting surface with a relief pattern of depth $\delta=30$ μm that has been UV cast on a transparent refractive foil material according to the invention. The overall depth of the optical security element is 100 μm, its area A being 1 cm². The refractive material of the foil has a refractive index n about 1.5 and is made of polyester. The refractive index of the resin used for forming the relief pattern is also about 1.5. Also shown (back image) is the projected caustic pattern on a screen (see also FIG. 4B). The reference pattern is that of FIG. 3.

Figure 4B:
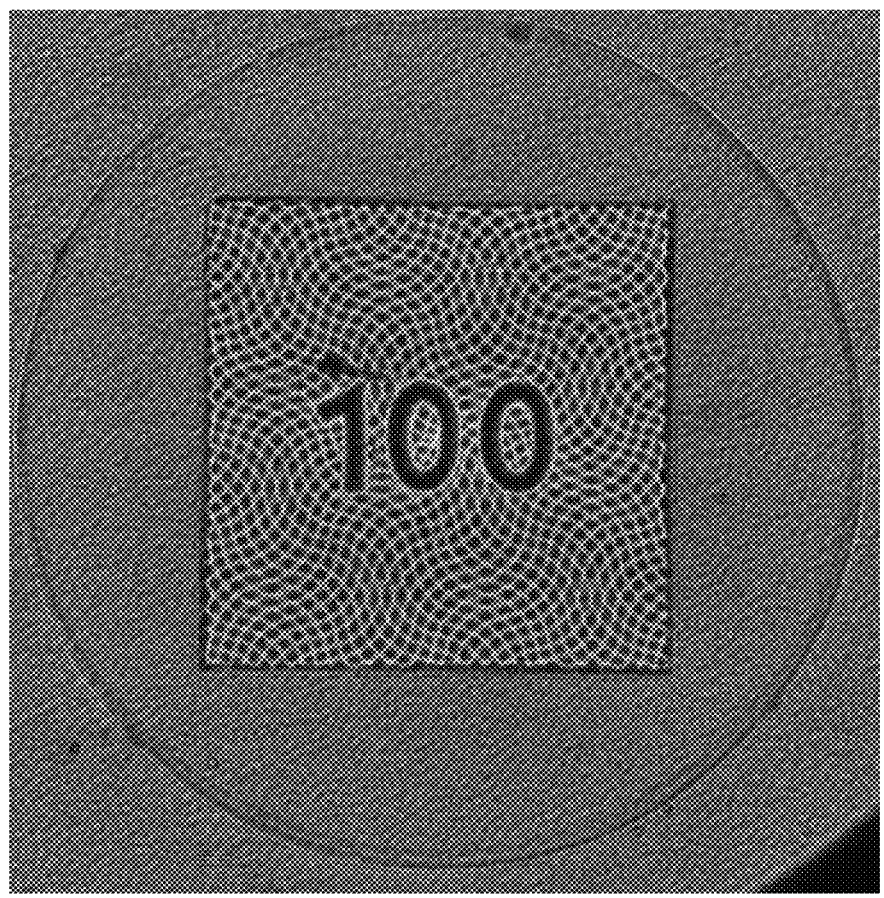
FIG. 4B is a photograph of caustic pattern projected by the optical security element shown in the foreground of FIG. 4A.

FIG. 4B is a photograph of caustic pattern projected by the optical security element of FIG. 4A. Here, the point-like light source is a LED at a distance $d_s=30$ cm from the light-redirecting surface, and the flat screen on which the caustic pattern is projected is at a distance $d_i=40$ mm. The caustic pattern neatly reproduces the pattern of number 100 with intaglio pattern of reference pattern of FIG. 3.

Figure 5:
FIG. 5 is a view of a projected caustic pattern corresponding to a reference pattern showing a portrait of George Washington.

FIG. 5 is a view of a projected caustic pattern corresponding to a reference pattern showing a portrait of George Washington, from a relief pattern having a depth of 30 μm, fulfilling the projection criterion of the invention, and illustrates the capabilities to project visible very fine details with good contrast.

The above disclosed subject matter is to be considered illustrative, and not restrictive, and serves to provide a better understanding of the invention defined by the independent claims.

The invention claimed is:

1. An optical security element comprising a reflective light-redirecting surface, or a refractive transparent or partially transparent light-redirecting surface of refractive index n, having a relief pattern of depth $\delta$ adapted to redirect incident light received from a point-light source, at a distance $d_s$ from the light-redirecting surface, and form a projected image containing a caustic pattern on a projection surface disposed at a distance $d_i$ from the light-redirecting surface, said caustic pattern reproducing a reference pattern, wherein upon illumination by the light source of an area of value A of the relief pattern and delivering an illuminance value $E_A$ by the optical security element to the projection surface, an average illuminance value $E_{\alpha 1}$ over a circular area of value $\alpha_1$ selected within an area of the projected image on the projection surface fulfills the following projection criterion $E_{\alpha 1} \leq E_A$ $(\frac{1}{2}+\alpha_0/\alpha_1+\sqrt{(\frac{1}{4}+\alpha_0/\alpha_1)})$, with scaling area parameter $\alpha_0=4\pi d_i \delta$ for the reflective light-redirecting surface, or $\alpha_0=2\pi(n-1) d_i \delta$ for the refractive light-redirecting surface, and $\alpha_1$ is smaller than the area value A.

2. The optical security element according to claim 1, wherein a value of $d_i$ is less than or equal to 30 cm and a value of the ratio $d_s/d_i$ is greater than or equal to at least 5.

3. The optical security element according to claim 1, wherein a value of depth $\delta$ of the relief pattern is less than or equal to 30 μm.

4. The optical security element according to claim 1, wherein a value of depth $\delta$ of the relief pattern is less than or equal to 250 μm.

5. The optical security element according to claim 1, wherein the relief pattern is disposed over a flat base, an overall thickness of the optical security element being less than or equal to 100 μm.

6. A method for designing a relief pattern of depth less than or equal to a value $\delta$ of a reflective light-redirecting surface, or a transparent or partially transparent light-redirecting surface of refractive index n, adapted to redirect incident light received from a point-light source, at a distance $d_s$ from the light-redirecting surface, and form a projected image containing a caustic pattern on a flat projection surface disposed at a distance $d_i$ from the light-redirecting surface, so that upon illumination by the light source of an area of value A of the relief pattern and delivering an illuminance value $E_A$ by the optical security element to the projection surface, an average illuminance value $E_{\alpha 1}$ over a circular area of value $\alpha_1$ selected within an area of the projected image on the projection surface fulfills the following projection criterion $E_{\alpha 1} \leq E_A$ $(\frac{1}{2}+\alpha_0/\alpha_1+\sqrt{(\frac{1}{4}+\alpha_0/\alpha_1)})$, with scaling area parameter $\alpha_0=4\pi d_i \delta$ for the reflective light-redirecting surface, or $\alpha_0=2\pi(n-1) d_i \delta$ for the refractive light-redirecting surface, and $\alpha_1$ is smaller than the area value A, said method comprising:

a) selecting a digital image of a reference pattern to be reproduced by the caustic pattern on the projection surface, the digital image comprising a total number of pixels $N_A$ and a sum of all pixel values over the digital image being $I_A$, by checking that for each circular area of N pixels within the digital image, with N integer and $1 \leq N \leq N_A$, a value I(N) of a sum of each pixel value of the N pixels in the circular area is less than a value $I_{max}(N)=N(I_A/N_A)(\frac{1}{2}+N_0/N+\sqrt{(\frac{1}{4}+N_0/N)})$, wherein $N_0$ is a number of pixels given by $N_A(\alpha_0/A)$ within the digital image;

b) calculating a relief pattern of depth less than or equal to 6 corresponding to the reference pattern on the digital image selected at a); and c) machining a surface of an optical material substrate to form a light-redirecting surface reproducing the relief pattern calculated at b), thereby obtaining an optical security element comprising said machined light-redirecting surface.

7. The method according to claim 6, wherein a), selecting a digital image of a reference pattern comprises modifying the digital image of the reference pattern of which a part does not fulfill a selection criterion that I(N) is less than $I_{max}(N)$, by adapting the pixel values within said part of the digital image, by making said part of the digital image with adapted pixel values to comply with the selection criterion for any N, with $1 \leq N \leq N_A$, thereby providing a modified digital image to be selected.

8. The method according to claim 7, wherein the pixel values of the digital image are adapted by filtering with a filter the image to reduce image contrast.

9. The method according to claim 6, wherein the machining of the surface of the optical material substrate comprises any one of ultra-precision machining, laser ablation, and lithography.

10. The method according to claim 6, further comprising that the machined light-redirecting surface is a master light-redirecting surface to be used to build a replica.

11. The method according to claim 10, further comprising replicating the machined light-redirecting surface on a substrate.

12. The method according to claim 10, wherein replication comprises one of UV casting and embossing.

13. A method of visually authenticating an object, marked with an optical security element, by a user, the optical security element comprising a reflective light-redirecting surface, or a refractive transparent or partially transparent light-redirecting surface of refractive index n, having a relief pattern of depth $\delta$ adapted to redirect incident light received from a point-light source, at a distance $d_s$ from the light-redirecting surface, and form a projected image containing a caustic pattern on a projection surface disposed at a distance $d_i$ from the light-redirecting surface, said caustic pattern reproducing a reference pattern, wherein upon illumination by the light source of an area of value A of the relief pattern and delivering an illuminance value $E_A$ by the optical security element to the projection surface, an average illuminance value $E_{\alpha 1}$ over a circular area of value $\alpha_1$ selected within an area of the projected image on the projection surface fulfills the following projection criterion $E_{\alpha 1} \leq E_A (\frac{1}{2} + \alpha_0/\alpha_1 + \sqrt{(\frac{1}{4} + \alpha_0/\alpha_1)})$, with scaling area parameter $\alpha_0 = 4\pi d_i \delta$ for the reflective light-redirecting surface, or $\alpha_0 = 2\pi(n-1) d_i \delta$ for the refractive light-redirecting surface, and $\alpha_1$ is smaller than the area value A, the method comprising:
- illuminating the light-redirecting surface of the optical security element with a point light source at the distance $d_s$ from the light-redirecting surface;
- visually observing on the caustic pattern as projected on the projection surface at distance $d_i$ form the optical security element; and
- deciding that the object is genuine upon evaluation by the user that the projected caustic pattern is visually similar to the reference pattern.

* * * * *